UNITED STATES PATENT OFFICE.

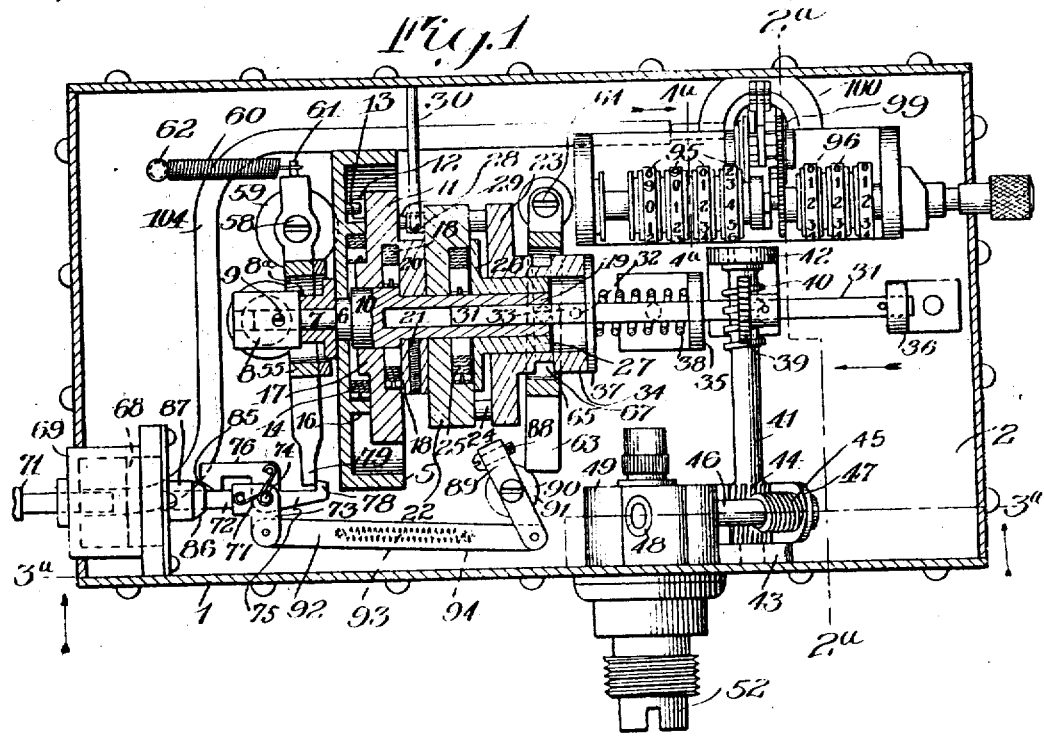

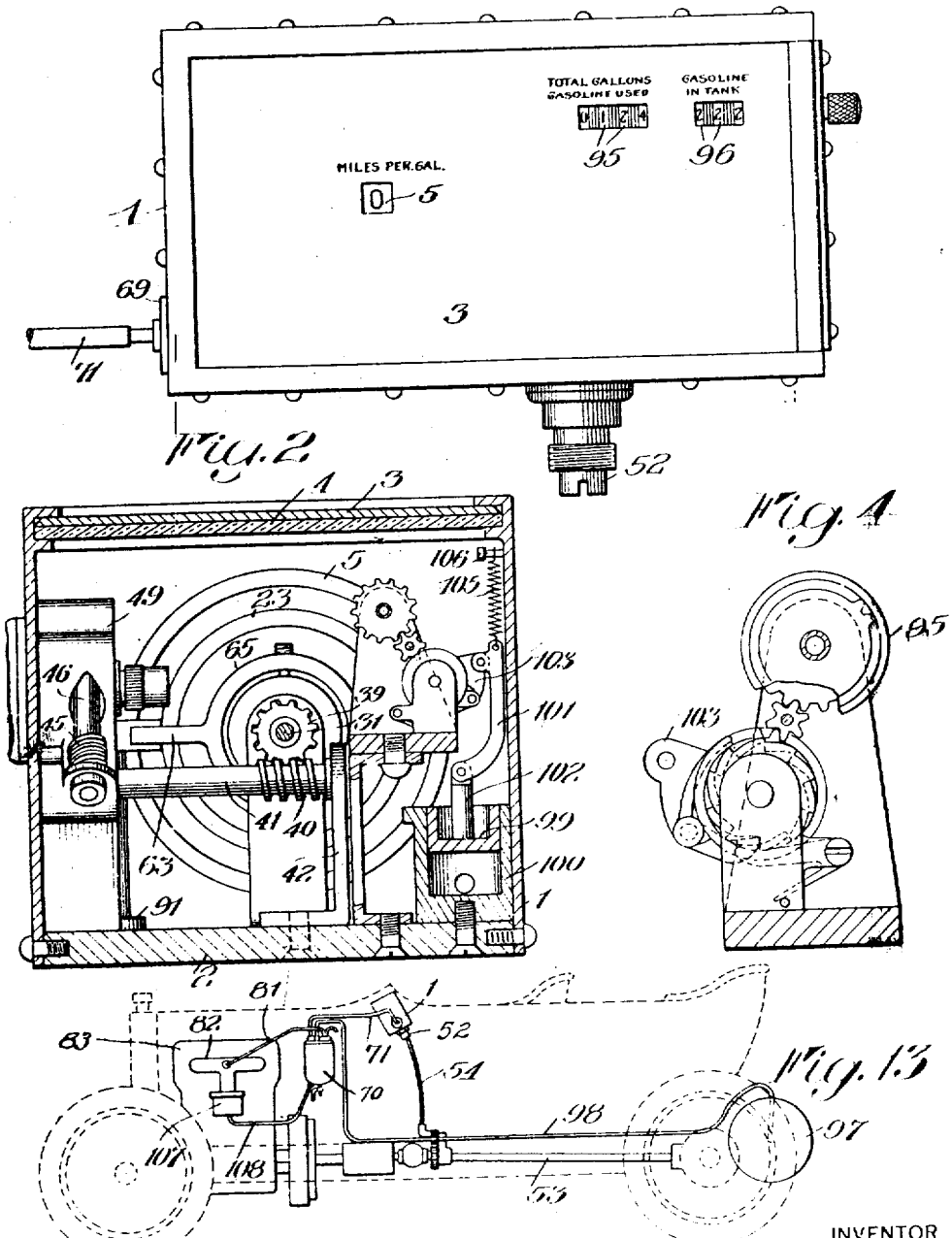

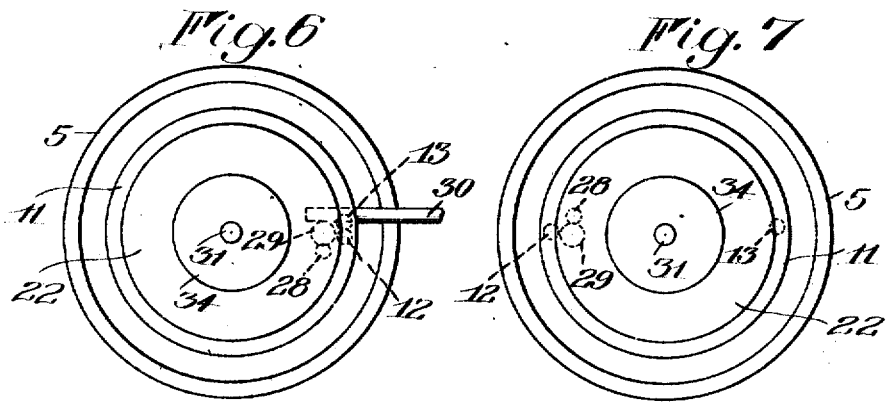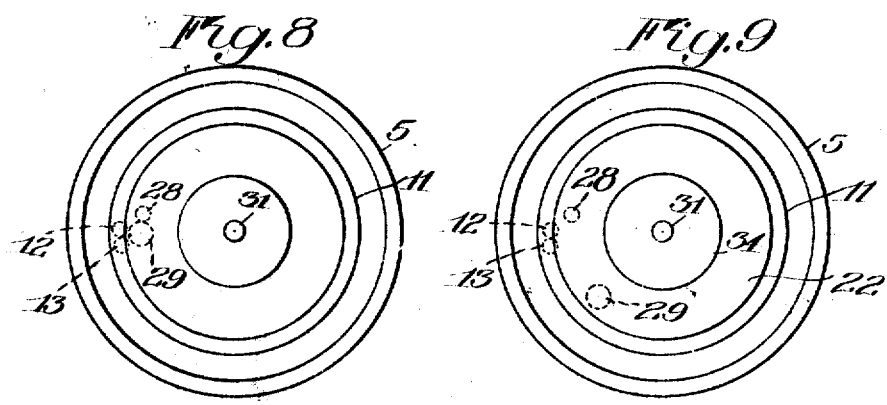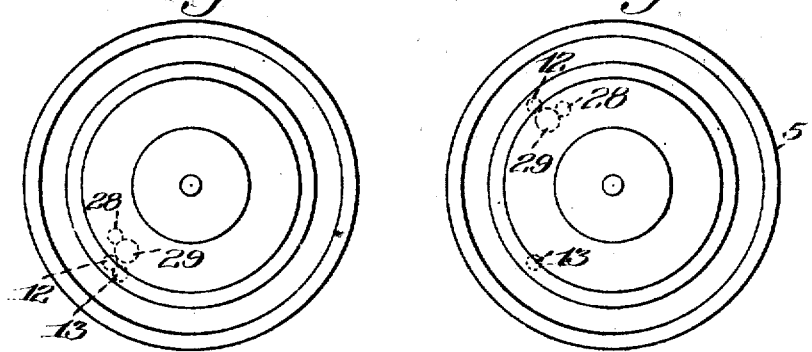

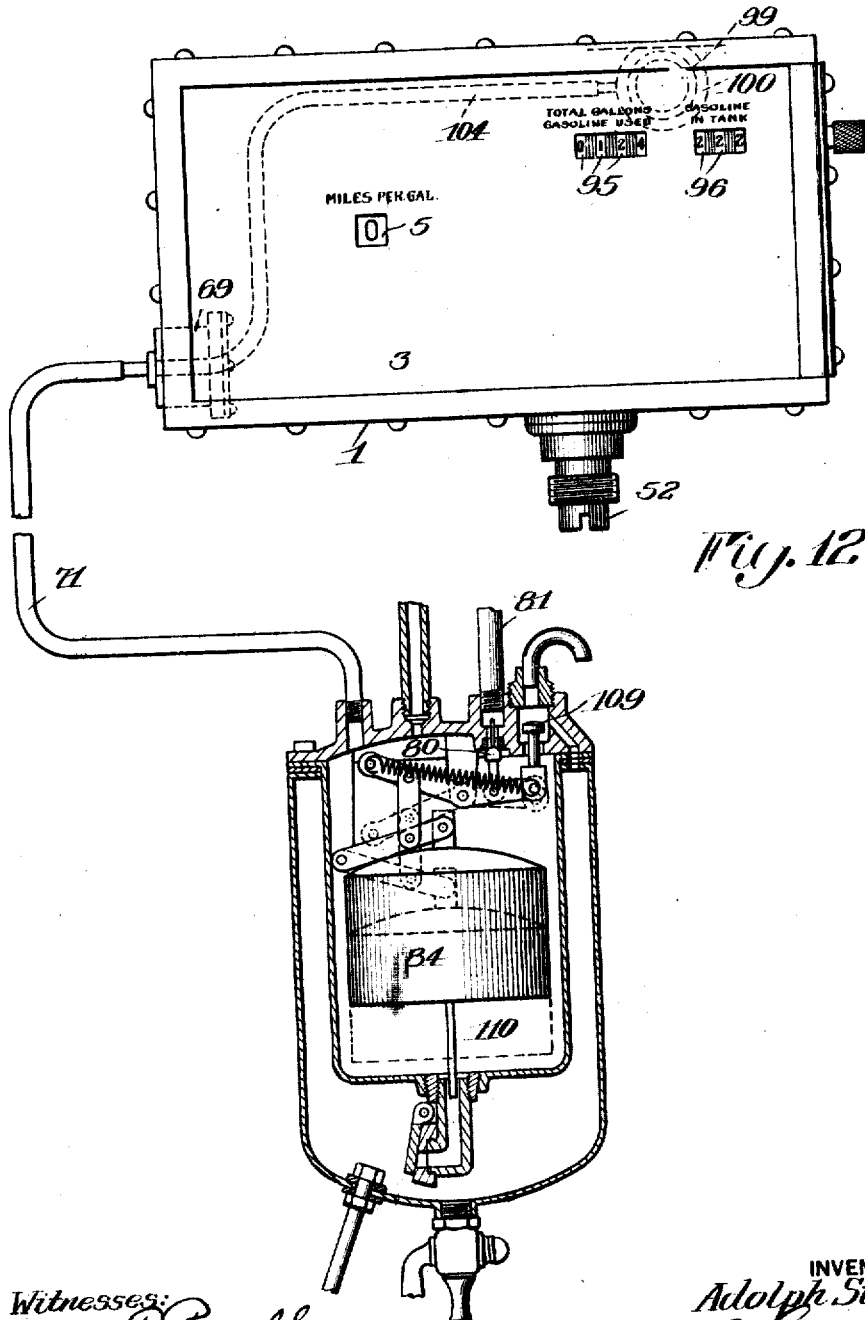

ADOLPH STUBER, OF ROCHESTER, NEW YORK.

REGISTERING MECHANISM.

1,410,772.  Specification of Letters Patent.  Patented Mar. 28, 1922.

Application filed May 11, 1918. Serial No. 233,888.

*To all whom it may concern:*

Be it known that I, ADOLPH STUBER, of Rochester, in the county of Monroe and State of New York, have invented certain new and useful Improvements in Registering Mechanisms; and I do hereby declare the following to be a full, clear, and exact description of the same, reference being had to the accompanying drawings, forming a part of this application, and to the reference numerals marked thereon.

The present invention relates to registering mechanisms of the type disclosed in my co-pending application, Serial No. 200,261, filed November 5, 1917, and has for its object to provide mechanism for determining the ratio in distance traveled per unit of fuel consumed by motor driven vehicles in combination with means for indicating the supply and total amount of fuel used by the motor. A further object of the invention is to provide a ratio indicating mechanism for indicating the amount of fuel consumed by an engine in proportion to the amount of work performed thereby. A still further object of the invention is to provide a motor driven ratio indicating mechanism for determining the amount of fuel consumed by the motor for a given amount of work performed thereby in combination with a fuel registering device, the latter being operatively connected with and the former releasably controlled by pneumatically actuated devices which are under the control of a vacuum fuel feeding system for supplying fuel to the motor. To these and other ends the invention resides in certain improvements and combinations of parts all as will be hereinafter more fully described, the novel features being pointed out in the claims at the end of the specification.

In the drawings:

Figure 1 is a front elevational view with the casing cover removed to show the fuel registering and ratio-indicating mechanisms, the latter being shown in section;

Figure 2 is a transverse sectional elevation taken on line 2ª—2ª of Figure 1;

Figure 3 is a longitudinal sectional view taken on line 3ª—3ª of Figure 1 with the clutches shown in release position;

Figure 4 is an enlarged sectional elevation taken on line 4ª—4ª of Figure 1;

Figure 5 is a front view of the casing showing the relative positions of the ratio-indicating and fuel registering mechanism;

Figures 6 to 11 inclusive are diagrammatic views of the ratio-indicating mechanism, drums or wheels shown in their several positions of operation;

Figure 12 is a sectional elevation taken through the vacuum controlled fuel measuring apparatus which is shown connected with the cylinders of the ratio-indicating and fuel registering mechanisms, and Figure 13 is a view in elevation showing the application of the invention to a motor driven vehicle.

Similar reference characters throughout the several views indicate the same parts.

The present invention comprises a pneumatically operated fuel registering mechanism actuated by suction produced in a small piston-carrying cylinder coupled with a vacuum controlled fuel feeding and measuring receptacle which is connected preferably with the manifold of an internal combustion engine to which fuel is supplied by said receptacle. The receptacle is also connected with a second cylinder having a pneumatically actuated piston which serves to effect, first the release of a holding clutch for a spring controlled indicating drum or wheel and thereafter a driving clutch for actuating said wheel connected with a flexible driving shaft actuated by a movable member arranged to be driven by the engine.

The two cylinders having the clutch releasing and registering mechanism operating pistons are preferably connected with the vacuum measuring tank by means of a single conduit leading from the mechanism casing to said tank in which a float operates by the rise and fall of liquid to periodically open and close a valve controlling the suction conduit leading to the manifold of the engine whereby the fuel measuring and ratio-indicating mechanisms are respectively operated and released simultaneously to indicate the total amount of fuel consumed, together with the amount remaining in the supply tank and the proportionate amount consumed by the engine for a given amount of work performed thereby, which in the present instance, is in terms of the distance traveled by the vehicle to which the engine is applied.

Referring to the drawings, 1 represents the casing containing the indicating and registering mechanisms which are preferably mounted upon a relatively heavy base 2 at the back of the casing while the front thereof is provided with a removable cover 8 beneath which is placed the protecting glass or transparent member 4 through which the indicating and registering mechanisms are observed, openings or windows in the cover being provided at the proper points as indicated in Figure 5. The ratio-indicating mechanism comprises an indicating wheel 5 journaled upon a bearing 6 preferably integral with a shaft 7 having its outer end extended into the post 8 and held therein by the set screw 9 as shown in Figure 1, said wheel 5 being spaced from the post 8 by means of the collar 8ª.

Adjacent the bearing 6 of the shaft 7 is an enlarged bearing 10 upon which is rotatably mounted a driven wheel or drum 11 lying within the indicating wheel 5 and provided with a projection 12 upon its face arranged to engage a similar projection 13 on the adjacent face of the indicating wheel for rotating the latter to wind up the spring 14, which spring actuates said wheel to proper indicating position when the latter is released by the clutch 15 in a manner to be hereinafter described. The spring 14 is held in a pocket formed by the centrally disposed ring 16 which is preferably integral with the wheel 5, one end of the spring being connected with said ring and the other with the hub 17 of the drum 11, as shown in Figure 1. The drum 11 is provided on its inner face with a pocket adapted to receive the spring 18 for actuating said drum in one direction, the inner end of the spring being connected with the bearing member 10 upon which the drum rotates and the outer end with the drum itself. Integral with the bearing 10 of the shaft 7 is a sleeve 19 upon which is mounted a collar 20 adjacent the drum 11, said collar being fixed or held upon the sleeve by means of the screw 21, as shown. Rotatably mounted upon the sleeve adjacent the collar is a driving wheel 22 (Fig. 3) held in spaced relation with respect to the drum 11 by said collar and arranged to be driven from a predetermined starting point or zero position by the driving clutch 23 having the cork or other flexible inserts 24 which normally engage the wheel 22 as shown in Figure 1. The driving wheel 22 when actuated and released by the clutch 23 is returned to zero position by the coil spring 25 held in the pocket formed in said wheel by means of the flange 26 integral with the clutch bearing 27 which is supported by the outer end of the sleeve 19.

The wheel 22 when driven by the clutch 23 serves to rotate the drum 11 in one direction to wind up the spring 18, the latter returning said drum to its initial starting point. The operating connections between the drum 11 and driving wheel 22 are the pins or projections 28 and 29 respectively, the latter engaging the stop 30 when the wheel 22 is in zero position as shown in Figure 1.

Rotatably mounted in the sleeve 19 is a driving shaft 31 for the clutch 23 having a transversely extending pin 32, the ends of which fit in longitudinally extending notches 33 formed within the hub 34 which is preferably integral with the clutch member 23. The shaft 31 is provided with the spaced bearings 35 and 36 which are preferably in the form of angular brackets mounted upon the base 2 of the casing, as shown in Figures 1 and 2. A washer 37 mounted on the shaft 31 against the face of the hub 34 and by contacting with the pin 32, serves to hold said shaft within the sleeve bearing 19, said washer being yieldingly held in contact with said hub by means of the spring 38 on the shaft between the washer and the bearing 35. Fixed upon the shaft 31 intermediate the bearings 35 and 36 is a gear 39 adapted to mesh with a worm 40 on a transverse shaft 41 having one end journaled in a bearing member 42 connected with the back 2 of the casing while the opposite end of said shaft is journaled in a bearing 43 mounted on the lower wall of the casing. The shaft 41 adjacent the bearing 43 is provided with a worm 44 adapted to be driven by the worm 45 on the shaft 46 one end of which is journaled in the bearing 47 while the opposite end of the shaft 46 is journaled in the bearing 48 carried by the bracket 49 which is preferably integral with the bearings 43 and 47. The shaft 46 adjacent the bearing 48 is also provided with a worm 50 meshing with a worm 51 on the shaft 52 journaled in the bracket 49 which is secured to the bottom of the casing, as shown. The worm shaft 52 is driven preferably by the transmission drive shaft 53 through the flexible shaft 54 as shown in Figure 13. It will be seen therefore that the flexible shaft 54 serves to drive the clutch 23 and clutch shaft 31 through the intermediate worm shafts 41, 46 and 52, as shown in Figure 1.

The clutch member 15 comprises the central ring 55 surrounding the collar 8ª and having the extended arms 56 carrying the cork or other flexible inserts 57 which normally engage and hold the indicating wheel 5 in whatever position it is moved to by the spring 14 when said wheel is released by the clutch. The clutch is pivoted at 58 upon the post 59 and is normally held in contact with the indicating wheel by means of the spring 60 having one end connected with the projection 61 of the clutch and the other end anchored upon the post 62.

The clutch member 23 is moved to release position by the lever 63 pivoted upon the post 64 and having the central ring portion 65 surrounding the hub of the clutch. The ring is provided with the adjustable pins 66 projecting into the groove 67 of said hub which effect movement of the latter when the lever is moved outwardly. The spring 38 serves to return the clutch to normal position when the lever 63 has been actuated and released in a manner which will presently be described.

The clutches 15 and 23 are both arranged to be pneumatically actuated to release position by the piston 68 in the cylinder 69 which is connected with the vacuum feed tank 70 by means of the conduit 71, as shown in Figure 13. The piston 68 is provided with a stem or rod 72 upon which is fixed a head 73 having pivoted thereon at 74 the clutch actuating member 75 which is integral with the releasing arm 76 normally held in the position shown in Figure 1 by the spring 77 which serves to maintain the lateral projection 78 of the pivoted member 75 in contact with the clutch arm 79 until such time as the valve 80 controlling the suction conduit 81 connecting the vacuum tank with the manifold 82 of the engine 83 is opened by movement of the float 84 which is operatively connected with said valve in a well known manner as shown in Figure 12. When said valve 80 is opened, suction is produced in the conduit 71 and cylinder 69 whereby the piston 68 and rod 72 are actuated to effect outward movement of the clutch arm 79 through the medium of the pivoted member 75. When the indicating wheel clutch has thus been moved to disengage the wheel, the pivoted member 75 is tripped by the releasing arm 76 when the beveled face 85 thereof rides upon the inclined face 86 of the piston rod guide 87 which is clearly shown in Figure 1.

The driving clutch for the wheel 22 is actuated to release position by the adjustable screw 88 on the inner end of the short lever 89 which is pivoted intermediate its ends at 90 to the post 91, the outer end of said lever being connected with the head 73 by means of the link 92.

The indicating wheel clutch is, however, adapted to be released and returned to normal position before the release of the driving clutch takes place in order that the indicating wheel may assume its proper indicating position before the wheel 22 is returned to zero position.

After the driving clutch has been released, the piston 68 and clutch operating parts actuated thereby are all returned to normal position by the spring 93 one end of which is anchored to the post 94 and the other to the link 92, as shown in Figure 3. When the piston 68 is being returned to the position shown in Figure 1 by said spring, the rounded portion of the clutch engaging member 78 will ride over the outer extremity of the clutch arm 79 and the spring 77 will then move the member 75 and projection 78 into normal position upon the clutch arm 79.

The adding and subtracting counters 95 and 96 respectively, for registering the amount of fuel in the supply tank 97, which is connected with the vacuum feed tank by means of the conduit 98 are of well known form and are operatively connected with the piston 99 of the cylinder 100 by means of the link 101 which is pivoted at one end to the piston rod 102 and at the other end to the segment 103 that serves to actuate said registering devices which are constructed and operated in a manner similar to that set forth in my co-pending application above referred to. The piston 99 is actuated simultaneously with the release of the indicating wheel clutch by the piston 68 of the cylinder 69, since the cylinder 100 is connected with the suction conduit 71 by means of the conduit 104 as shown in Figure 3. The piston 99 is returned to normal position within the cylinder 100 by means of the coil spring 105 connected with the link 101 and with the pin 106 secured upon the wall of the casing. The vacuum fuel feeding and measuring tank is adapted to periodically discharge predetermined quantities of fuel to be fed to the carburetor 107 of the engine through the conduit 108 at such times as the valve 80 is closed and the air inlet valve 109 open, but as soon as the float 84 in the measuring receptacle 110 reaches a predetermined point during its descent, the valve 80 is opened and the air inlet valve 109 closed, thus placing the suction conduit 81 in communication with said receptacle and effecting simultaneous movement of the pistons 68 and 99 by means of the suction produced in the cylinders of the pistons through the conduit 71.

The pneumatic release of the clutches controlling the ratio-indicating wheel will therefore be periodically effected at the expiration of the consumption of a predetermined quantity of fuel by the engine and in the present instance, the distance traveled by the vehicle during said fuel consumption period will be registered by the indicating wheel which is always held by the clutch during such consumption periods and released at the expiration thereof.

In the operation of the ratio-indicating mechanism, assuming that the driving wheel 22, drum 11 and indicating wheel 5 are all at zero position as shown in Figures 1 and 6 and the vehicle is then driven a distance of 20 miles for the first gallon or unit of fuel consumed by the engine, the pins 12, 28 and 29 will reach the position shown in Figure 7. If now, the clutch 15 is released, the pin 13 will move to the position shown in Figure 8 at which position the wheel 5 will register "20" and said clutch will then return to engagement with the indicating wheel and thereafter the driving clutch 23 will be released and the spring 25 will return the wheel 22 to zero position and move the pin 29 back to the position shown in Figure 6, but the pins 12, 13 and 28 will be held in the position shown in Figure 8. For the next gallon of fuel consumed by the engine, if the vehicle should only travel 15 miles, then the pin 29 would reach the position shown in Figure 9 and when the clutch 15 is again released, the pins 12, 13 and 28 will move to the position shown in Figure 10 and thereafter when the driving clutch is released, the pin 29 will again return to zero position leaving the pins 12, 13 and 28, as shown in Figure 10. For the third gallon of fuel consumed, if the vehicle should travel 25 miles, the pin 13 would remain in the position shown in Figure 10 and the pins 12, 28 and 29 would move to the position shown in Figure 11, but as soon as the indicating wheel clutch is released, the pin 13 will again move into engagement with the pin 12 and said indicating wheel will then register "25", after which when the driving clutch is released, the pin 29 will move back to zero position.

It will be understood that in the operations just described, the pins are moved by the wheels or drums to which they are attached, the latter being moved, of course, by their respective springs.

I claim as my invention:

1. A registering mechanism comprising a rotatable indicating wheel, a clutch normally holding said wheel against rotation, a setting mechanism for operating said wheel when released, a driving clutch for actuating said setting mechanism, means for rotating said driving clutch, a reciprocally mounted member, means for effecting operation of the same, a clutch operating member pivoted upon said reciprocally mounted member for actuating the first mentioned clutch, means for moving said operating member to release said clutch, a lever for effecting release of said driving clutch after the release of said indicating wheel and a link connecting said lever with said reciprocally mounted member.

2. A registering mechanism comprising a rotatable indicating wheel, a clutch normally holding said wheel against rotation, means for returning said clutch to normal position when actuated, a setting mechanism for operating said wheel when released, a driving clutch for actuating said setting mechanism, means for rotating said driving clutch, a reciprocatory member, a clutch actuating member pivoted thereon and adapted to move the first mentioned clutch to release position when the member begins to move in one direction, means for causing said clutch actuating member to release said clutch as the reciprocatory member approaches the limit of its movement, a lever adapted to move said driving clutch to release position after the first mentioned clutch has returned to normal position, and link means connecting said lever with said reciprocatory member.

ADOLPH STUBER.